(12) United States Patent
Shenoy et al.

(10) Patent No.: US 8,563,672 B2
(45) Date of Patent: Oct. 22, 2013

(54) PROCESS FOR PRODUCING FLUORINATED COPOLYMERS OF (METH)ACRYLATES AND (METH)ACRYLIC ACID AMINE COMPLEXES

(75) Inventors: Siddhartha Shenoy, Wilmington, DE (US); Joel M. Pollino, Elkton, MD (US); Anilkumar Raghavanpillai, Wilmington, DE (US); Brad M. Rosen, Philadelphia, PA (US); Ernest Byron Wysong, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 51 days.

(21) Appl. No.: 13/301,077

(22) Filed: Nov. 21, 2011

(65) Prior Publication Data

US 2012/0157640 A1 Jun. 21, 2012

Related U.S. Application Data

(60) Provisional application No. 61/424,233, filed on Dec. 17, 2010.

(51) Int. Cl.
*C08F 20/06* (2006.01)
*C08F 20/22* (2006.01)

(52) U.S. Cl.
USPC ...... 526/220; 526/245; 526/317.1; 526/318.4

(58) Field of Classification Search
USPC .......................................... 526/245
See application file for complete search history.

(56) References Cited

U.S. PATENT DOCUMENTS

| | | | |
|---|---|---|---|
| 3,282,905 A | 11/1966 | Fasick et al. | |
| 3,979,469 A | 9/1976 | Jager | |
| 4,569,965 A | 2/1986 | Engel et al. | |
| 5,030,684 A * | 7/1991 | Rauch-Puntigam et al. | . 524/513 |
| 5,410,005 A * | 4/1995 | Nemoto et al. | ............... 526/245 |
| 5,481,028 A | 1/1996 | Petrov et al. | |
| 6,037,429 A | 3/2000 | Linert et al. | |
| 6,303,190 B1 | 10/2001 | Linert et al. | |
| 6,465,591 B1 | 10/2002 | Lee | |
| 2007/0178239 A1 | 8/2007 | Kestell et al. | |
| 2007/0197717 A1 | 8/2007 | Ueda et al. | |

FOREIGN PATENT DOCUMENTS

| | | |
|---|---|---|
| CN | 1730502 | 2/2006 |
| CN | 101469148 | 7/2009 |
| EP | 1743910 | 1/2007 |
| EP | 2206735 | 10/2008 |
| FR | 2730736 | 8/1996 |
| FR | 2922447 | 4/2009 |
| JP | 03287615 A * | 12/1991 |
| JP | 04202382 | 7/1992 |
| JP | 1994239941 | 8/1994 |
| JP | 04153274 | 5/1996 |
| JP | 09279097 | 10/1997 |
| JP | 11256070 | 9/1999 |
| WO | 9511877 | 5/1995 |
| WO | 9700230 | 1/1997 |
| WO | 0006612 | 2/2000 |
| WO | 0119883 | 3/2001 |
| WO | 0136526 | 5/2001 |
| WO | 03018508 | 3/2003 |
| WO | 2005097850 | 10/2005 |

OTHER PUBLICATIONS

Balague et al., Synthesis of fluorinated telomers. Part 1. Telomerization of vinylidene fluoride with perfluoroalkyl iodides, Journal of Fluorine Chemistry, 1995, 70, 215-223, Elesevier.

* cited by examiner

*Primary Examiner* — Vu A Nguyen

(57) ABSTRACT

A process for producing copolymers of (meth)acrylates: (meth)acrylic acid amine complexes useful for hard surfaces having increased performance for stain resistance, oil and water repellency properties.

12 Claims, No Drawings

PROCESS FOR PRODUCING FLUORINATED COPOLYMERS OF (METH)ACRYLATES AND (METH)ACRYLIC ACID AMINE COMPLEXES

FIELD OF THE INVENTION

This invention relates to a process for the preparation of copolymers having increased stain resistance, oil and water repellency for hard substrates.

BACKGROUND OF THE INVENTION

Hard surfaces, such as, stone, masonry, concrete, unglazed tile, brick, porous clay and various other substrates, are used decoratively and functionally in indoor and outdoor environments. When untreated, these materials are susceptable to staining from water, oil, and foodstuffs such as kethcup, mustard, coffee, cooking oils, wine, and beverages. Several products exist in the marketplace for treating these substrates. Stone and tile treatment products are commonly a copolymer containing a fluorinated monomer, for stain release and oil repellency, with a non-fluorinated monomer providing water repellency.

Linert, et al., in WO199700230, describe a composition comprising a fluoroaliphatic groups, carboxyl containing groups, oxyalkene groups and optionally silyl groups which provide repellency to oil- and water-based stains for porous substrates.

Ueda et al., in US20070197717, describe a masonry treating agent comprising fluoromonomer, a monomer having at least one acid group, and a non-fluorinated monomer having a hydrophobic group.

What is needed are self-dispersed coating copolymer that provide superior performance for stain resistance, oil and water repellency to hard substrates. These coating copolymer should have good adhesion properties to the substrates capable of withstanding multiple rinse cycles and still maintain good performance against stains and oil and water repellency. These coating copolymers should be easily produced by a simplified process without adding significant process steps or costs. The present invention meets these needs.

SUMMARY OF THE INVENTION

The present invention a process for producing copolymer having improved stain resistance, oil and water repellency properties comprising (a) contacting 40 to 70 mol % of a (meth)acrylate monomer of Formula (I);

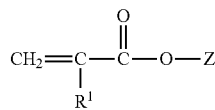

(I)

with 30 to 60 mol % of a (meth)acrylic acid and a first amine of Formula (II);

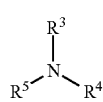

(II)

at a ratio of 1 mole of amine per mole of (meth)acrylic acid forming a first mixture; (b) contacting the first mixture with an initiator forming a copolymer;
wherein
Z is $R_f(CH_2)_n$— or $R_h$—;
$R_f$ is $C_2$ to $C_{10}$ fluoroalkyl, optionally interrupted by one or more —O—, —$CH_2$—, —CFH—, or combinations thereof;
n is an integer from 1 to 10;
$R_h$ is $C_2$ to $C_{22}$ linear, branched, cyclic, or aryl alkyl;
$R^1$ and $R^2$ are each independently H or $CH_3$;
$R^3$ is H, $CH_3$, or $CH_2CH_3$;
$R^4$ is H, $CH_3$, or $CH_2CH_3$;
$R^5$ is H, $CH_2CH_3$, $C_3$ to $C_{18}$ alkyl or Y;

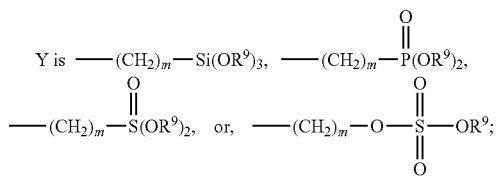

$R^9$ is alkyl, alkyl alcohol, or hydrogen; and
m is 1 to 10.

The present invention further comprises a process for producing copolymer having improved stain resistance, oil and water repellency properties comprising (a) contacting 40 to 70 mol % of a (meth)acrylate monomer of Formula (I) with 30 to 60 mol % of a (meth)acrylic acid and a first amine of Formula (II) at a ratio of (1-q) mole of amine per mole of (meth)acrylic acid forming a first mixture; (b) contacting the first mixture with an initiator forming a copolymer; (c) contacting the copolymer with q moles of a second amine of Formula (II); wherein 0<q≤0.9; Z, $R_f$, n, $R_h$, $R^1$, $R^2$, $R^3$, $R^4$, $R^5$, Y, $R^9$, and m are as defined as above.

DETAILED DESCRIPTION

Herein, trademarks are shown in upper case.

The term "(meth)acrylic" refers to both methacrylic and acrylic compounds and the term "(meth)acrylate" refer to both a methacrylate and acrylate compounds.

The present invention a process for producing copolymer having improved stain resistance, oil and water repellency properties comprising (a) contacting 40 to 70 mol % of a (meth)acrylate monomer of Formula (I);

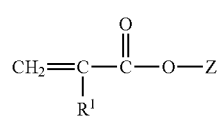

(I)

with 30 to 60 mol % of a (meth)acrylic acid and a first amine of Formula (II);

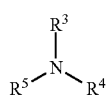

(II)

at a ratio of 1 mole of amine per mole of (meth)acrylic acid forming a first mixture; (b) contacting the first mixture with an initiator forming a copolymer;

wherein

Z is $R_f(CH_2)_n$— or $R_h$—;

$R_f$ is $C_2$ to $C_{10}$ fluoroalkyl, optionally interrupted by one or more —O—, —$CH_2$—, —CFH—, or combinations thereof;

n is an integer from 1 to 10;

$R_h$ is $C_2$ to $C_{22}$ linear, branched, cyclic, or aryl alkyl;

$R^1$ and $R^2$ are each independently H or $CH_3$;

$R^3$ is H, $CH_3$, or $CH_2CH_3$;

$R^4$ is H, $CH_3$, or $CH_2CH_3$;

$R^5$ is H, $CH_2CH_3$, $C_3$ to $C_{18}$ alkyl or Y;

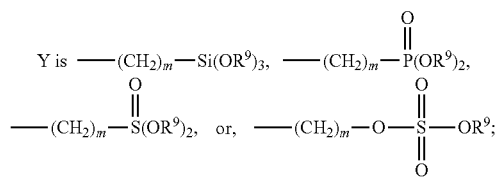

$R^9$ is alkyl, alkyl alcohol, or hydrogen; and m is 1 to 10.

The present invention further comprises a process for producing copolymer having improved stain resistance, oil and water repellency properties comprising (a) contacting 40 to 70 mol % of a (meth)acrylate monomer of Formula (I) with 30 to 60 mol % of a (meth)acrylic acid and a first amine of Formula (II) at a ratio of (1−q) mole of amine per mole of (meth)acrylic acid forming a first mixture; (b) contacting the first mixture with an initiator forming a copolymer; (c) contacting the copolymer with q moles of a second amine of Formula (II); wherein 0<q≤0.9; Z, $R_f$, n, $R_h$, $R^1$, $R^2$, $R^3$, $R^4$, $R^5$, Y, $R^9$, and m are as defined as above.

In the present invention, the molar concentration of the (meth)acrylate monomers and the molar concentration of the (meth)acrylic acid are chosen such that they will be within the previously specified molar range and the sum of the combined components is equal to 100%. One skilled in the art can easily choose molar percentages for each monomer within the stated ranges so that the total equals 100%. For example, the molar % concentration of the (meth)acrylate monomers can be any of 40, 41, 42, 43 and so on, up to 70; and the molar % concentration of the (meth)acrylate acid can be any of 30, 31, 32, 33, 34, and so on up to 60. The combination of any individual value for the molar % concentration of the (meth) acrylate monomers is from 40 to 70 and any individual value for the molar % concentration of the (meth)acrylate acid is from 30 to 60, that totals 100 is included within the present invention.

In a first embodiment, copolymers of the present invention are prepared by simultaneously contacting a (meth)acrylate monomer, (meth)acylic acid, and one or more amines in the presence of a radical initiator where the molar amount of amines is a 1:1 molar ratio with the molar concentration of the (meth)acrylic acid producing a copolymer containing (meth) acrylate, (meth)acrylic acid, and amine salts of (meth)acrylic acid. In a second embodiment, copolymers of the present invention are prepared by first contacting (meth)acylic acid and one or more amines prior to contacting with a (meth) acrylate monomer in the presence of a radical initiator where the molar amount of amines is a 1:1 molar ratio with the molar concentration of the (meth)acrylic acid producing a copolymer containing (meth)acrylate, (meth)acrylic acid, and amine salts of (meth)acrylic acid. In a third embodiment, wherein 0<q≤0.9, copolymers of the present invention are prepared by simultaneously contacting a (meth)acrylate monomer, (meth) acylic acid, and one or more amines in the presence of a radical initiator where the molar amount of amines is less than the molar amount of (meth)acrylic acid acid (1−q moles of amine per moles of (meth)acrylic acid) producing a copolymer containing (meth)acrylate, (meth)acrylic acid, and amine salts of (meth)acrylic acid. In this third embodiment, the corresponding copolymers are then neutralized with one or more amines (1−q moles of amine per moles of (meth)acrylic acid) to produce a corresponding second (meth)acrylic acid salt or salts. In a fourth embodiment, wherein 0<q≤0.9, copolymers of the present invention are prepared by first contacting (meth)acylic acid and one or more amines prior to contacting with a (meth)acrylate monomer in the presence of a radical initiator where the molar amount of the amines is less than the molar amount of (meth)acrylic acid acid (1−q moles of amine per moles of (meth)acrylic acid) producing a copolymer containing (meth)acrylate, (meth)acrylic acid, and amine salts of (meth)acrylic acid. In this fourth embodiment, the corresponding copolymers are then neutralized with one or more amines (1−q moles of amine per moles of (meth)acrylic acid) to produce a corresponding second (meth)acrylic acid salt or salts.

The process of the present invention are carried out in the presence of one or more initiators. The initiators are present at 0.1 to 6.0 weight percent relative to the weight of the monomers employed. Initiators which may be used are peroxides such as, for example, benzoyl peroxide, lauroyl peroxide, succinyl peroxide and tert-butyl perpivalate, or azo compounds such as 2,2'-azobisisobutyronitrile, 4,4'-azobis(4-cyanopentanoic acid) and azodicarbonamide. Such azo initiators are commercially available from E. I. du Pont de Nemours and Company, Wilmington, Del., under the name of "VAZO" 67, 52 and 64, and by Wako Pure Industries, Ltd., Osaka, Japan, under the name "V-501". The process may also be performed in the presence of UV radiation and photoinitiators such as benzophenone, 2-methylanthraquinone or 2-chlorothioxanthone.

The temperature of the present invention varies within a wide range, that is to say between room temperature and the boiling point of the reaction mixture. The process is preferably performed between from about 50 to from about 90° C. More preferably, from about 60 to from about 75° C.

The (meth)acrylate monomers useful in the present invention are of Formula (I)

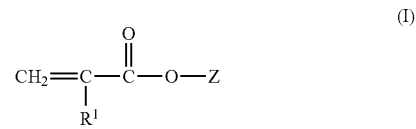

wherein Z is $R_f(CH_2)_n$— or $R_h$—. $R_f$ is $C_2$ to $C_{10}$ fluoroalkyl, optionally interrupted by one or more —O—, —$CH_2$—, —CFH—, or combinations thereof; n is an integer from 1 to 10; $R_h$ is $C_2$ to $C_{22}$ linear, branched, cyclic, or aryl alkyl; and $R^1$ and $R^2$ are each independently H or $CH_3$.

Examples of $R_f$ include, but are not limited to, $CF_3(CF_2)_x$—, $CF_3(CF_2)_x(CH_2CF_2)_y$—, $CF_3(CF_2)_yO(CF_2)_y$—, and $CF_3(CF_2)_yOCFH(CF_2)_z$—, wherein each x is independently 1 to 9, each y is independently 1 to 3, and each z is independently 1 to 4. Preferably, $R_f$ is $C_4$ to $C_8$ fluoroalkyl, more preferably, $R_f$ is $C_6$ fluoroalkyl. Preferably, n is 2 to 6, more preferably n is 2.

Examples of $R_h$ include, but are not limited to, butyl(meth) acrylate, hexyl (meth)acrylate, octyl(meth)acrylate, ethylhexyl(meth)acrylate, and stearyl (meth)acrylate. Preferably, $R_h$ is $C_4$ to $C_{18}$ alkyl. These (meth)acrylates are commercially available from various distributors including Sigma-Aldrich, St. Louis, Mo.

Fluorinated (meth)arcylates of Formula (I) wherein Z is $R_f$, are synthesized from the corresponding alcohols. These fluorinated methacrylate compounds are prepared by either esterification of the corresponding alcohol with acrylic acid or methacrylic acid or by tranesterification with methyl acrylate or methyl methacrylate. These preparations are well known and are described in U.S. Pat. No. 3,282,905, herein incorporated by reference.

Fluorinated (meth)arcylates useful in the present invention are prepared from alcohols having the formula $CF_3(CF_2)_x(CH_2)_nOH$ wherein each x is independently 1 to 9 and n is 1 to 10, are commercially available from E. I. Du Pont de Nemours and Company, Wilmington, Del. These alcohols can also be prepared by reaction of the corresponding perfluoroalkyl iodides with oleum and hydrolyzed according to the procedure described in WO 95/11877, herein incorporated by reference. These alcohols are available as a homologue distribution mixture or are fraction distilled into individual chain lengths.

Fluorinated (meth)acrylates useful in the present invention are prepared from alcohols having the formula $CF_3(CF_2)_y(CH_2CF_2)_p(CH_2)_nOH$ wherein each y is independently 1 to 9, each p is independently 1 to 2, and n is 1 to 10. These alcohols are prepared by the telomerization of perfluoroalkyl iodides with vinylidene fluoride followed by ethylene insertion. A detailed description of the vinylidene fluoride reaction is described in Balague, et al., "Synthesis of Fluorinated telomers, Part 1, Telomerization of vinylidene fluoride with perfluoroalkyl iodides", J. Fluor. Chem. (1995), 70(2), 215-23. Reaction details for the ethylene insertion reaction is described in U.S. Pat. No. 3,979,469. The alcohol is prepared with oleum and hydrolysis as described above.

Fluorinated (meth)arcylates useful in the present invention are prepared from alcohols having the formula $CF_3(CF_2)_yO(CF_2)_y—(CH_2)_nOH$ wherein each y is independently 1 to 3 and n is 1 to 10. These alcohols are prepared from the corresponding perfluoroalykl ether iodides, of formula $CF_3(CF_2)_yO(CF_2)_yI$ wherein each y is independently 1 to 3. These iodides are prepared according to the procedure described in U.S. Pat. No. 5,481,028, hereby incorporated by reference, by reacting a perfluorovinyl ether with ICl/HF and $BF_3$. Ethylene insertion and alcohol conversion is as described above.

Amines useful in the present invention are those readily capable of forming a salt with (meth)acrylic acid. The first amine and second amine may be the same or different. Amines useful in the present invention have the generic formula $NR_3$ where each R is independently $R^3$, $R^4$, $R^5$ as defined above. Amines useful in the present invention include, but are not limited to, ammonia, alkylamines, alkanolamines, alkoxyamines, aminoalkyl sulfates, aminoalkyl sulfonates, aminoalkyl phosphonates, and aminoalkyl silanes. Specific examples of linear amines useful in the present invention include, but are not limited to, ammonium hydroxide, mono-, di-, and trimethylamine, mono-, di-, triethylamine, mono-, di-, and triethanolamines, 2-aminoethanesulfonic acid, 2-aminoethylhydrogen sulfate, dodecylamine and N—N-dimethyldodecylamine, butylamine, hexylamine, heptylamine, octylamine, nonylamine, decylamine, hexadecylamine, dibutylamine, dioctylamine, tripentylamine, tripropylamine, tributylamine, tridodecylamine, 3-methoxypropylamine, N,N-dimethylethyl amine, N,N-dimethylbutylamine, N,N-diethylbutylamine, N-methyldibutylamine, N,N-dimethyl octylamine, N,N-dimethyldodecylamine. Specific examples of branched amines include, but are not limited to, isopropylamine, isobutylamine, tertbutylamine, amylamine, diisopropylamine, diisobutylamine, 3-isopropoxypropylamine, 2-ethylhexylamine. Specific examples of cyclic amines include but are not limited to, cyclopentylamine, cyclohexylamine, cyclodecylamine, 1-adamantylamine, dicyclohexylamine, N,N-dimethylcyclohexylamine. Specific examples of aryl amines include but are not limited to, N,N-diethylaniline, N,N-dimethylbenzylamine, 4-N,N-trimethylaniline, 3-phenyl-1-propylamine. Specific examples of silicone containing amines included but are not limited to, (3-aminopropyl) trimethoxysilane, (3-aminopropyl)triethoxysilane, N,N-dimethylaminopropyl trimethoxysilane, N,N-dimethylaminopropyl triethoxysilane, 3-aminopropyl functionalized silica nanoparticle, (trimethylsilyl)methylamine, N,N-diethyltrimethylsilylamine, 3-(2-aminoethylamino)propyldimethoxymethylsilane, (3-aminopropyl)tris(trimethylsiloxy)silane.

The copolymers prepared from the present invention are preferably in the form of an aqueous dispersion.

The present invention comprises a copolymer a having improved stain resistance, oil and water repellency prepared by a process comprising (a) contacting 40 to 70 mol % of a (meth)acrylate monomer of Formula (I);

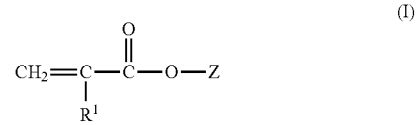

with 30 to 60 mol % of a (meth)acrylic acid and a first amine of Formula (II);

at a ratio of (1-q) moles of amine per moles of (meth)acrylic acid forming a first mixture; (b) contacting the first mixture with an initiator at a temperature of from about 50 to from about 90° C. for a time at least equal to the half life of the radical initiator, forming a copolymer; (c) contacting the copolymer with q moles of a second amine of Formula (II); wherein q is 0 to 0.9;

Z is $R_f(CH_2)_n$— or $R_h$—;

$R_f$ is $C_2$ to $C_{10}$ fluoroalkyl, optionally interrupted by one or more —O—, —$CH_2$—, —CFH—, or combinations thereof;

n is an integer from 1 to 10;

$R_h$ is $C_2$ to $C_{22}$ linear, branched, cyclic, or aryl alkyl;

$R^1$ and $R^2$ are each independently H or $CH_3$;

$R^3$ is H, $CH_3$, or $CH_2CH_3$;

$R^4$ is H, $CH_3$, or $CH_2CH_3$;

$R^5$ is H, $CH_2CH_3$, $C_3$ to $C_{18}$ alkyl or Y;

Y is —$(CH_2)_m$—$Si(OR^9)_3$,

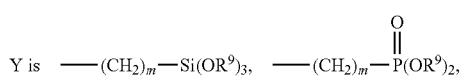

-continued

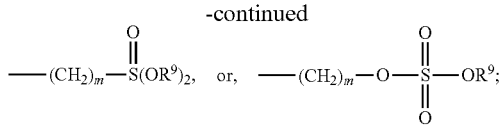

R$^9$ is alkyl, alkyl alcohol, or hydrogen; and
m is 1 to 10.

Surprisingly, it was found that by first complexing (meth)acrylic acid with the amines of Formula (II) prior to contacting with (meth)acrylate monomers, an increase in stain resistance, oil and water repellency. This improved stain resistance, oil and water repellency was also found when simultaneously contacting (meth)acrylate monomers, (meth)acrylic acid, and the amines of Formula (II). While not to be bound by theory, it was found that by pre-complexing the amines with (meth)acrylic acid prior to, or simultaneously during polymerization, the (meth)acrylate monomers tend to migrate to the beginning of the copolymer chain. This migration of like monomers improves stain resistance, oil and water repellency. This phenomium is found for both fluorinated and non-fluorinated (meth)acrylate monomers.

The process and copolymers of the present invention are useful in providing improved stain resistance and water and oil repellency for a variety of substrates. The copolymer are easily adaptable for a variety of applications.

EXAMPLES

Materials and Test Methods

Application and Testing of Polymers on Stone Tile Surface

The copolymers prepared from the present invention were applied as dispersions and tested on limestone and saltillo stone tiles. The stone tiles are wiped with a damp SONTARA wipe (commercially available from E. I. Du Pont de Nemours and Company, Wilmington, Del.). The stones dried overnight at room temp and sectioned into 9 equal segments by adhesive tape. Two wt % solutions of the polymer copolymer of the present invention were applied as dispersions to each section using a bristle brush. The amount of polymer applied was determined by taking the weight difference of the polymer stock solution before and after application. Each section was brushed with a dispersion to form one even coat. Typically four main brush passes were used to cover the surface. After 15 minutes, any excess polymer on the surface, was removed by buffing the surface with a wipe. The coating was allowed to dry overnight and then performance evaluated by the test methods described below.

Test Method 1. Water and Oil Beading Test

Individual drops of water and vegetable oil (approximately 4 to 5 mm in diameter or 0.04 to 0.05 mL volume) were placed on the coated surface using a glass pipette. The drop was allowed to sit on the surface for five minutes and the degree of beading (i.e., contact angle) was visually determined. The degree of beading is rated from 0 to 5 as shown in the Table 1 below. Higher ratings are indicative in superior repellency performance.

TABLE 1

Water and Oil Contact Angle Measurments

| Rating | Contact angle (°) | Significance |
|---|---|---|
| 0 | <10 | Penetration of liquid |
| 1 | 10 to 25 | Poor Beading |

TABLE 1-continued

Water and Oil Contact Angle Measurments

| Rating | Contact angle (°) | Significance |
|---|---|---|
| 2 | 25 to 45 | Fair Beading |
| 3 | 45 to 75 | Good Beading |
| 4 | 75 to 90 | Very good Beading |
| 5 | 90 to 120 | Excellent Beading |

Test Method 2. 24-Hour Stain Testing:

One drop each of common household stains (mustard, ketchup, vegetable oil, salad dressing coffee) were individually placed on the treated tile surface and allowed to sit for 24 hours. The stains were removed by washing with water and a nylon bristle brush. The treated stone was allowed to dry at room temperature (72 to 78° F.) until the stone was completely dry (approximately 12 to 24 hours). The stain residue remaining on the tile surface was visually rated from 0 to 4 as follows. Lower rating indicates better performance. Liquid stains that does not leave a visible surface stain but penetrates deep into the substrate are given a rating 4. The stain procedure was repeated 4 times and averaged.

TABLE 2

24-Hour stain ratings

| Rating | Visual Observation |
|---|---|
| 0 | No stain |
| 1 | Very light stain |
| 2 | Light stain |
| 3 | Moderate stain |
| 4 | Heavy stain or Penetration of liquid stain deep into the substrate |

A stain score aggregate is calculated by adding the sum of all stain scores for a test sample and the performance compared with the total maximum possible score (i.e., for 5 stains, the highest rating is 20).

Test Method 3—Water Repellency Test

The water repellency of saltillo substrates were measured according to AATCC (American Association of Textile Chemists and Colorists) standard Test Method No. 193-2004. The test determined the resistance of the treated substrate to wetting by aqueous test solutions (see Table 3 for Test Solution copolymer). Drops of test solutions (approximately 5 mm in diameter or 0.05 mL volume) of water-alcohol mixtures of varying surface tensions were placed on the treated substrate and the extent of surface wetting was determined visually. Three drops of test solution #1 were placed on the substrate. After 10 seconds, the drops were removed by using vacuum aspiration. If no liquid penetration or partial absorption (appearance of a darker wet patch on the substrate) was observed, the test was repeated with Test Liquid 2 and with progressively higher Test Liquid numbers until liquid penetration (appearance of a darker wet patch on the substrate) was observed. The rating was the highest Test Liquid number that did not penetrate into the substrate. Higher scores indicate greater water repellency and superior performance.

The composition of water repellency test liquids is shown in the Table 3 below.

TABLE 3

| Test Solution # | Composition, Volume % | | Rating Number |
|---|---|---|---|
| | Isopropyl Alcohol | Distilled Water | |
| 1 | 2 | 98 | 1 |
| 2 | 5 | 95 | 2 |
| 3 | 10 | 90 | 3 |
| 4 | 20 | 80 | 4 |
| 5 | 30 | 70 | 5 |
| 6 | 40 | 60 | 6 |
| 7 | 50 | 50 | 7 |
| 8 | 60 | 40 | 8 |
| 9 | 70 | 30 | 9 |
| 10 | 80 | 20 | 10 |
| 11 | 90 | 10 | 11 |
| 12 | 100 | 0 | 12 |

Test Method 4. Oil Repellency Test

The oil repellency of treated substrates was tested using a modification of AATCC standard Test Method No. 118, and was modified as follows. A series of organic liquids, identified below in the Table 4, were applied drop wise to the substrate. Beginning with the lowest numbered test liquid (Repellency Rating No. 1), one drop (approximately 5 mm in diameter or 0.05 mL volume) was placed on each of three locations at least 5 mm apart. The drops were observed for 30 seconds. If, at the end of this period, two of the three drops were still spherical in shape with no wicking around the drops, three drops of the next highest numbered liquid were placed on adjacent sites and similarly observed for 30 seconds. The procedure was continued until one of the test liquids results in two of the three drops failed to remain spherical to hemispherical, or wetting or wicking occurs.

The oil repellency rating was the highest numbered test liquid for which two of the three drops remained spherical to hemispherical, with no wicking for 30 seconds. Higher scores indicate greater oil repellency.

TABLE 4

| Rating Number | Test Solution |
|---|---|
| 0 | Fails NUJOL* Purified Mineral Oil |
| 1 | NUJOL* Purified Mineral Oil |
| 2 | 65/35 Nujol ®/n-hexadecane by volume at 21 C. |
| 3 | n-hexadecane |
| 4 | n-tetradecane |
| 5 | n-dodecane |
| 6 | n-decane |
| 7 | n-octane |
| 8 | n-heptane |

*NUJOL (comercially available from Plough, Inc., Memphis, Tennesse) is a mineral oil having a Saybolt viscosity of 360/390 at 38° C. and a specific gravity of 0.880/0.900 at 15° C.

EXAMPLES

Example 1

A copolymer of Formula I was prepared in organic solvent. Perfluoroalkyl methacrylate, having the formula $CF_3(CF_2)_5CH_2CH_2OC(O)C(CH_3)=CH_2$ (10 g, 23.1 mmol, commercially available from E. I. du Pont de Nemours and Company, Wilmington, Del.), methyl acrylic acid (3.30 g, 38.4 mmol), (3-aminopropyl)trimethoxysilane (6.88 g, 38.4 mmol), and tetrahydrofuran (THF, 62 g) were added to a nitrogen purged reaction vessel equipped with a magnetic stir bar and condensor. The reaction vessel was then sparged with nitrogen at room temperature (approximately 23° C.) for one hour. The reaction vessel was then heated to 60° C. and initiator (0.27 g in 2 g isopropanol, VAZO 67, commercially available from E. I. du Pont de Nemours and Company, Wilmington, Del.) was added to the reaction flask using a syringe. The temperature of the reaction vessel was raised to 68° C. and held at 68° C. for 1 hour. The reaction mixture formed a gel. The reaction mixture was then cooled and held at 25° C. for 18 hours. The mixture was then added to water (100 mL) and titrated. The reaction mixture was then reduced in vacuo. It was further diluted with water and tested according to the test method described above.

Examples 2

The fluorinated methacrylate/methacrylic acid copolymer (23.2 g, 35.3 mmol in THF) prepared above in Example 3,3-aminopropyl functionalized silica nanoparticles (1 g, 3 weight % in ethanol), and THF (25 g) were added to a nitrogen purged reaction vessel equipped with a magnetic stir bar and condensor. The reaction mixture was heated to 68° C. and stirred under a nitrogen blanket for 1 hour. Addition 3-aminopropyl functionalized silica nanoparticles (1 g, 3 weight % in ethanol) was added to the reaction mixture followed by addition of triethylamine (0.9 g, 8.9 mmol). Water (50 mL) was then added and the mixture was stirred for an additional 30 minutes at 68° C. The reaction mixture was then cooled to room temperature. The mixture was concentrated in vacuo to remove residual THF and resulted in a 12.4 weight % solids dispersion in water. It was further diluted with water and tested according to the test methods described above.

Example 3

Perfluoroalkyl methacrylate, having the formula $CF_3(CF_2)_5CH_2CH_2OC(O)C(CH_3)=CH_2$ (10 g, 23.1 mmol), methyl acrylic acid (3.30 g, 38.4 mmol), (3-aminopropyl)trimethoxysilane (6.88 g, 38.4 mmol), triethylamine (3.80 g, 37.6 mmol) and tetrahydrofuran (THF, 62 g) were added to a nitrogen purged reaction vessel equipped with a magnetic stir bar and condensor. The reaction vessel was then sparged with nitrogen at room temperature (approximately 23° C.) for one hour. The reaction vessel was then heated to 60° C. and initiator (0.27 g in 2 g isopropanol, VAZO 67, commercially available from E. I. du Pont de Nemours and Company, Wilmington, Del.) was added to the reaction flask using a syringe. The temperature of the reaction vessel was raised to 68° C. and held at 68° C. for 20 minutes. The temperature was then reduced to 65° C. and was stirred for 18 hours. The reaction mixture was then cooled to room temperature (23° C.) and solids settled to the bottom of the flask. The liquid supernatant was decanted. The solids were triturated and dissolved into water (90 mL) and combined with the liquid supernatant. This mixture was then reduced in vacuo to 14.5 weight % solids in water. It was further diluted with water and tested according to the test methods described above.

Example 4

Perfluoroalkyl methacrylate, having the formula $CF_3(CF_2)_5CH_2CH_2OC(O)C(CH_3)=CH_2$ (10 g, 23.1 mmol), methacrylic acid (16.5 g, 192 mmol), triethylamine (1.92 g, 18.9 mmol), and tetrahydrofuran (28.7 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.27 g, in 1 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/triethylamine salt copolymer as a 30 weight % solids in THF.

The fluorinated methacrylate/methacrylic acid/methacrylic acid salt copolymer (23.2 g, 35.3 mmol in THF), 2 aminoethanesulfonic acid (1.01 g, 8.08 mmol in 23.2 g water), and THF (25 g) were added to a nitrogen purged reaction vessel equipped with a magnetic stir bar and condensor. The reaction mixture was heated to 45° C. and stirred under a nitrogen blanket for one hour. The mixture was concentrated in vacuo to remove residual THF and resulted in a 24.0 weight % solids dispersion in water. It was further diluted with water and tested according to the test methods described above.

Example 5

The fluorinated methacrylate/methacrylic acid/methacrylic acid salt copolymer (23.2 g, 35.3 mmol in THF) prepared above in Example 5 and 2-aminoethyl hydrogensulfate (1.14 g, 8.08 mmol in 23.2 g water) were added to a nitrogen purged reaction vessel equipped with a magnetic stir bar and condensor. The reaction mixture was heated to 68° C. and stirred under a nitrogen blanket for 1 hour. Addition 3-aminopropyl functionalized silica nanoparticles (1 g, 3 weight % in ethanol) was added to the reaction mixture followed by addition of triethylamine (0.9 g, 8.9 mmol). Water (50 mL) was then added and the mixture was stirred for an additional 30 minutes at 68° C. The reaction mixture was then cooled to room temperature. The mixture was concentrated in vacuo to remove residual THF and resulted in a 22.0 weight % solids dispersion in water. It was further diluted with water and tested according to the test methods described above.

Example 6

Perfluoroalkyl methacrylate, having the formula $CF_3(CF_2)_5$ $CH_2CH_2OC(O)C(CH_3)=CH_2$ (10 g, 23.1 mmol), methacrylic acid (2.31 g, 26.9 mmol), 2-aminoethanesulfonic acid (1.01 g, 8.1 mmol), and tetrahydrofuran (28.7 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.27 g, in 1 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/2-aminoethanesulfonic acid salt copolymer as a 30 weight % solids in THF.

Ammonium hydroxide (14.6 M, 3.92 g, 23.1 mmol in water) was then added to the reaction mixture and the reaction mixture was heated to 45° C. and stirred under a nitrogen blanket for one hour. The mixture was cooled to room temperature and concentrated in vacuo to remove residual THF and resulted in a 23.9 weight % solids dispersion in water. It was further diluted with water and tested according to the test methods described above.

Example 7

Perfluoroalkyl methacrylate, having the formula $CF_3(CF_2)_5$ $CH_2CH_2OC(O)C(CH_3)=CH_2$ (10 g, 23.1 mmol), methacrylic acid (2.31 g, 26.9 mmol), N,N-dimethyldecylamine (0.86, 4.65 mmol), and tetrahydrofuran (30.7 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.27 g, in 1 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/N,N-dimethyldecylamine salt copolymer as a 17.4 weight % solids in THF.

The fluorinated methacrylate/methacrylic acid/N,N-dimethyldecylamine salt copolymer (6.6 g, in THF) was heated to 45° C. and ammonium hydroxide (14.6 M, 0.81 g in 24.8 g water) was added. The reaction mixture was stirred under a nitrogen blanket for one hour at 45° C. The mixture was concentrated in vacuo to remove residual THF and resulted in a 17.4 weight % solids dispersion in water. It was further diluted with water and tested according to the test methods described above.

Example 8

The fluorinated methacrylate/methacrylic acid/N,N-dimethyldecylamine salt copolymer (6.6 g) prepared in Example 8 was heated to 45° C. in a reaction vessel equipped with a magnetic stir bar and condensor. Ethylamine (1.13 g, 11.1 mmol) was added dropwise to the reaction mixture. The mixture was stirred for one hour at 45° C. Water (24.8 g) was added to the reaction mixture. The mixture was concentrated in vacuo to remove residual THF and resulted in a 19.7 weight % solids dispersion in water. It was further diluted with water and tested according to the test methods described above.

Example 9

Perfluoroalkyl methacrylate, having the formula $CF_3(CF_2)_5$ $CH_2CH_2OC(O)C(CH_3)=CH_2$ (10 g, 23.1 mmol), methacrylic acid (2.31 g, 26.9 mmol), dodecylamine (0.86 g, 4.65 mmol), and tetrahydrofuran (30.7 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.27 g, in 1 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/dodecylamine copolymer as a 30 weight % solids in THF.

The fluorinated methacrylate/methacrylic acid/dodecylamine copolymer (6.6 g in THF) and ammonium hydroxide (14.6 M, 0.81 g, 13.4 mmol in 24.8 g water) were added to a nitrogen purged reaction vessel equipped with a magnetic stir bar and condensor. The reaction mixture was heated to 45° C. and stirred under a nitrogen blanket for one hour. The mixture was concentrated in vacuo to remove residual THF and resulted in a 20.1 weight % solids dispersion in water. It was further diluted with water and tested according to the test methods described above.

Example 10

The fluorinated fluorinated methacrylate/methacrylic acid/dodecylamine copolymer (6.6 g) prepared in Example 10 was heated to 45° C. in a reaction vessel equipped with a magnetic stir bar and condensor. Ethylamine (1.13 g, 11.1 mmol) was added dropwise to the reaction mixture. The mixture was stirred for one hour at 45° C. Water (24.8 g) was added to the reaction mixture. The mixture was concentrated in vacuo to remove residual THF and resulted in a 22.3 weight % solids dispersion in water. It was further diluted with water and tested according to the test methods described above.

Example 11

Perfluoroalkyl methacrylate, having the formula $CF_3(CF_2)_5 CH_2CH_2OC(O)C(CH_3)=CH_2$ (2.5 g, 5.75 mmol), methacrylic acid (0.82 g, 9.6 mmol), diethylaminomethyl phosphonate (0.8 g, 4.8 mmol), and tetrahydrofuran (11.2 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. Initiator (0.35 g of VAZO 67 in 0.5 g THF) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid/methacrylic acid:diethylaminomethyl phosphonate copolymer (28 wt % solids in THF). The copolymer (14.8 g, in THF) was heated to 45° C. and ammonium hydroxide (0.290 g (28 wt % $NH_3$), 4.8 mmol) in 24 g water) was added. The reaction mixture was stirred under a nitrogen blanket for one hour at 55° C. The mixture was concentrated in vacuo to remove residual THF and resulted in a 19.4 weight % solids dispersion in water. It was further diluted with water and tested according to the test methods described above.

Comparative Example A

A copolymer was prepared in organic solvent wherein the amine is added after polymerization. Perfluoroalkyl methacrylate, having the formula $CF_3(CF_2)_5CH_2CH_2OC(O)C(CH_3)=CH_2$ (50 g, 115 mmol), methacrylic acid (16.5 g, 192 mmol), and tetrahydrofuran (THF, 155 g) were added to a nitrogen purged reaction vessel equipped with a magnetic stir bar and condensor. The reaction vessel was then sparged with nitrogen at room temperature (approximately 23° C.) for one hour. The reaction was then heated to 60° C. and stirred for five minutes. Initiator (1.35 g in 10 g THF, VAZO 67) was added to the reaction flask using a syringe. The temperature of the reaction mixture was raised to 68° C. and held at 68° C. for 16 hours. The reaction mixture was then cooled to room temperature (23° C.) and was analyzed to be a fluorinated methacrylate/methacrylic acid copolymer as a 30 weight % solids in THF.

The fluorinated methacrylate/methacrylic acid copolymer (23.2 g, 35.3 mmol in THF), N,N-dimethlaminopropyltrimethoxysilane (0.1 g, 0.44 mmol), triethylamine (2.18 g, 21.6 mmol), and THF (25 g) were added to a nitrogen purged reaction vessel equipped with a magnetic stir bar and condensor. The reaction mixture was heated to 68° C. and stirred under a nitrogen blanket for two hours. Water (50 mL) was then added and the mixture was stirred for an additional 30 minutes at 68° C. The reaction mixture was then cooled to room temperature. The mixture was concentrated in vacuo to remove residual THF and resulted in a 16.5 weight % solids dispersion in water and tested according to the test methods described above.

Example 13

A copolymer prepared form a process of the present invention was prepared using an alkyl methacrylate. To an oven-dried 100 mL three-neck round bottom flask equipped with a thermocouple well, a sparge tube, a magnetic stir bar, and a reflux condenser bearing was added butyl methacrylate (5.46 g, 38.4 mmol), methacrylic acid (1.99 g, 23.1 mmol), 1,3,5-trimethylbenzene (0.07 g, 0.58 mmol), triethylamine (2.33 g, 23.1 mmol), and THF (29.8 g). The stirred solution was sparged with N2 for 60 min. The reaction mixture was then heated to 68° C. To the heated solution was added VAZO 67 (0.27 g in 2 g of THF) as a solution by syringe. At this point the reaction mixture was heated to to obtain a stable internal solution temperature of 68° C. The mixture was heated for 16 h at this temperature. After 18 h, the solution was treated with $H_2O$ (30 mL) and concentrated in vacuo to remove residual organic solvent, affording the polymer as a stable milky-white dispersion in water (20.8 wt % solids, pH=9).

Comparative Example C

A copolymer was prepared using an alkyl methacrylate and where the amine was added after the polymerization step. Butyl methacrylate (5.46 g, 38.4 mmol), methacrylic acid (1.99 g, 23.1 mmol), 1,3,5-trimethylbenzene (0.07 g, 0.58 mmol), and tetrahydrofuran (29.8 g) were added to a nitrogen purged reaction vessel equipped with a magnetic stir bar and condensor. The reaction vessel was then sparged with nitrogen at room temperature (approximately 23° C.) for one hour. The reaction mixture was then heated to 68° C. Initiator (0.27 g of VAZO 67 in 2 g of THF) was added to the reaction flask using a syringe. The reaction mixture was heated to a temperature of 68° C. and held for 18 h. After 18 h, the solution was treated with triethylamine (2.33 g, 23.1 mmol), then $H_2O$ (30 mL) and concentrated in vacuo to remove residual organic solvent, affording the polymer as a stable milky-white dispersion in water (19.2 wt % solids, pH=9) and tested according to the test methods described above.

Comparative Example D

A copolymer was prepared using an alkyl methacrylate where the amine was added after the polymerization step. Butyl methacrylate (5.46 g, 38.4 mmol), methacrylic acid (1.99 g, 23.1 mmol), 1,3,5-trimethylbenzene (0.07 g, 0.58 mmol), and tetrahydrofuran (29.8 g) were added to a nitrogen purged reaction vessel equipped with a magnetic stir bar and condensor. The reaction vessel was then sparged with nitrogen at room temperature (approximately 23° C.) for one hour. The reaction mixture was then heated to 68° C. Initiator (0.27 g VAZO 67 in 2 g of THF) was added to the reaction flask using a syringe. The reaction mixture was heated to a temperature of 68° C. and held for 18 h. After 18 h, the solution was treated with $NH_4OH$ (1.69 g, 23.1 mmol) in water (30 mL) and concentrated in vacuo to remove residual organic solvent, affording the polymer as a stable milky-white dispersion in water (16.3 wt % solids, pH=8-9) and tested according to the test methods described above.

Examples 1 though 10 were applied to saltillo surfaces and tested according to Test Method 1, Oil and Water Beading, Test Method 2, 24-Hour Stain Test, Test Method 3, Water repellency, and Test Method 4, Oil Repellency according to the methods as described in above. Untreated saltillo and Comparative Example A (a post complexed copolymer) was also tested as a comparison. Results are listed below in Table 5 for Water and Oil Beading, Table 6 for Stain Test results, and Table 7 for Test Methods 3 and 4 Oil and Water Repellency results.

TABLE 5

Stone and Tile Oil and Water Beading Scores
(rating 0 to 5, 5 is best), Saltillo

| Example | Oil Beading | Water Beading |
| --- | --- | --- |
| Control | 0 | 0 |
| Example 1 | 4 | 4 |
| Example 2 | 5 | 5 |
| Example 3 | 2 | 3 |
| Example 4 | 5 | 5 |
| Example 5 | 4 | 4 |
| Example 6 | 3 | 3 |
| Example 7 | 3 | 3 |
| Example 8 | 3 | 3 |
| Example 9 | 4 | 4 |
| Example 10 | 3 | 3 |
| Example A | 4 | 4 |

TABLE 6

Stain Scoring (0-4, 0 is best), Saltillo

| Examples | Mustard | Ketchup | Veg. Oil | Dressing | Coffee | Total |
| --- | --- | --- | --- | --- | --- | --- |
| Control | 3 | 3 | 4 | 4 | 4* | 18 |
| Example 1 | 2 | 0 | 2 | 1 | 0 | 5 |
| Example 2 | 2 | 3 | 3 | 3 | 1 | 12 |
| Example 3 | 3 | 2 | 1 | 3 | 2 | 11 |
| Example 4 | 2 | 2 | 0 | 1 | 3 | 8 |
| Example 5 | 1 | 1 | 0 | 0 | 3 | 5 |
| Example 6 | 0 | 0 | 0 | 0 | 0 | 0 |
| Example 7 | 0 | 0 | 0 | 0 | 0 | 0 |
| Example 8 | 0 | 0 | 0 | 0 | 0 | 0 |
| Example 9 | 1 | 1 | 1 | 1 | 1 | 5 |
| Example 10 | 1 | 1 | 0 | 1 | 0 | 3 |
| Example A | 1 | 1 | 0 | 0 | 4 | 6 |

*represents deep penetration of stain to substrate

TABLE 7

Water and Oil Repellency Test Ratings (0-12 for water,
12 is best, 0-8 for oil, 8 is best), Saltillo

| Example | Water Kit Test | Oil Kit Test |
| --- | --- | --- |
| Control | 0 | 0 |
| Example 1 | 10 | 4 |
| Example 2 | 5 | 4 |
| Example 3 | 6 | 6 |
| Example 4 | 8 | 5 |
| Example 5 | 9 | 6 |
| Example 6 | 10 | 6 |
| Example 7 | 10 | 6 |
| Example 8 | 10 | 6 |
| Example 9 | 11 | 6 |
| Example 10 | 6 | 3 |
| Comparative Example A | 9 | 6 |

Copolymers made from the process of the present invention that incorporated alkyl(meth)acrylates were tested saltillo, limestone and granite surfaces and tested according to Test Method 2, 24-Hour Stain Test according to the methods as described in above. Untreated saltillo, untreated limestone, and untreated granite and Comparative Example B and C (post complexed copolymers) was also tested as a comparison. Results are listed below in Table 5 for Water and Oil Beading, Table 6 for Stain Test results, and Table 7 for Test Methods 3 and 4 Oil and Water Repellency results.

TABLE 8

Stain Scoring (0-4, 0 is best), Saltillo

| Examples | Mustard | Ketchup | Red Wine | Ink | Coffee | Total |
| --- | --- | --- | --- | --- | --- | --- |
| Control | 4 | 2 | 3 | 4 | 4* | 17* |
| Example 11 | 4 | 1 | 4 | 0 | 1 | 10 |
| Comparative Example B | 4 | 1 | 3 | 3 | 0 | 11 |
| Example C | 4 | 3 | 2 | 2 | 2 | 14 |

*represents deep penetration of stain to substrate

TABLE 9

Table 6. Stain Scoring (0-4, 0 is best), Limestone

| Examples | Mustard | Ketchup | Red Wine | Ink | Coffee | Total |
| --- | --- | --- | --- | --- | --- | --- |
| Control | 4 | 4 | 4 | 4 | 4 | 20 |
| Example 11 | 1 | 0 | 2 | 2 | 1 | 5 |
| Comparative Example B | 2 | 2 | 3 | 3 | 0 | 10 |

TABLE 10

Stain Scoring (0-4, 0 is best), Granite

| | Red Wine | Ink | Total |
| --- | --- | --- | --- |
| Control | 4 | 3 | 7 |
| Example 11 | 3 | 2 | 5 |
| Comparative Example B | 4 | 4 | 8 |

What is claimed is:

1. A process for producing copolymer having improved stain resistance, oil and water repellency properties comprising (a) contacting 40 to 70 mol % of a (meth)acrylate monomer of Formula (I);

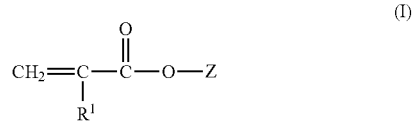

(I)

with 30 to 60 mol % of a (meth)acrylic acid and a first amine of Formula (II);

(II)

at a ratio of 1 mole of amine per mole of (meth)acrylic acid forming a first mixture; (b) contacting the first mixture with an initiator forming a copolymer;
wherein
Z is Rf(CH2)n-;
Rf is C2 to C10 fluoroalkyl, optionally interrupted by one or more —O—, —CH2-, —CFH—, or combinations thereof;
n is an integer from 1 to 10;
Rh is C2 to C22 linear, branched, cyclic, or aryl alkyl;

R1 and R2 are each independently H or CH3;
R3 is H, CH3, or CH2CH3;
R4 is H, CH3, or CH2CH3;
R5 is Y;

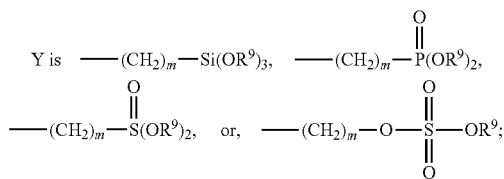

R9 is alkyl, alkyl alcohol, or hydrogen; and
m is 1 to 10.

2. A process of claim 1, wherein the (meth)acrylate monomer, the (meth)acrylic acid and the first amine are contacted simultaneously.

3. A process of claim 1, wherein the (meth)acrylic acid and the first amine are contacted prior to contacting with the (meth)acrylate monomer.

4. A process of claim 1, wherein the initiator is present at a concentration of 0.1 to 6.0 weight percent relative to the total weight of the (meth)acrylate monomer and (meth)acrylic acid.

5. A process of claim 1, wherein and the polymerization is at a temperature of from about 50 to from about 90° C. for a time at least equal to the half life of the radical initiator.

6. A process of claim 1, wherein Rf is C4 to C6 fluoroalkyl and n is 2 to 6.

7. A process for producing copolymer having improved stain resistance, oil and water repellency properties comprising (a) contacting 40 to 70 mol % of a (meth)acrylate monomer of Formula (I);

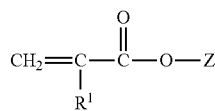

with 30 to 60 mol % of a (meth)acrylic acid and a first amine of Formula (II);

at a ratio of (1-q) mole of amine per mole of (meth)acrylic acid forming a first mixture; (b) contacting the first mixture with an initiator forming a copolymer; (c) contacting the copolymer with q moles of a second amine of Formula (II);
wherein
$0<q\leq 0.9$;
Z is Rf(CH2)n-;
Rf is C2 to C10 fluoroalkyl, optionally interrupted by one or more —O—, —CH2-, —CFH—, or combinations thereof;
n is an integer from 1 to 10;
Rh is C2 to C22 linear, branched, cyclic, or aryl alkyl;
R1 and R2 are each independently H or CH3;
R3 is H, CH3, or CH2CH3;
R4 is H, CH3, or CH2CH3;
R5 is Y;

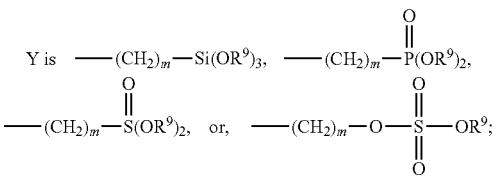

R9 is alkyl, alkyl alcohol, or hydrogen; and
m is 1 to 10.

8. A process of claim 7, wherein the (meth)acrylate monomer, the (meth)acrylic acid and the first amine are contacted simultaneously.

9. A process of claim 7, wherein the (meth)acrylic acid and the first amine are contacted prior to contacting with the (meth)acrylate monomer.

10. A process of claim 7, wherein the initiator is present at a concentration of 0.1 to 6.0 weight percent relative to the total weight of the (meth)acrylate monomer and (meth)acrylic acid.

11. A process of claim 7, wherein and the polymerization is at a temperature of from about 50 to from about 90° C. for a time at least equal to the half life of the radical initiator.

12. A process of claim 7, wherein Rf is C4 to C6 fluoroalkyl and n is 2 to 6.

* * * * *